Patented Nov. 11, 1952

2,617,796

UNITED STATES PATENT OFFICE 2,617,796

AMIDE SYNTHESIS

James R. Vaughan, Jr., Glenbrook, Conn., assignor to American Cyanamid Company, New York, N. Y., a corporation of Maine No Drawing. Application February 1, 1951, Serial No. 208,989

14 Claims. (Cl. 260—112)

This invention relates to a new method of organic synthesis, and more particularly to a new method of preparing amides and peptides.

The new method of this invention comprises reacting an amine having amine hydrogen with a mixed anhydride of a diester of arsenous acid and a carboxylic acid. These mixed anhydrides may be represented by the formula:

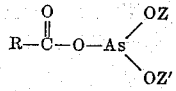

in which

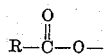

represents an organic radical derived from a carboxylic acid, and Z and Z' represent nonfunctional esterifying radicals. The radicals represented by Z and Z' are connected to the oxygen by a carbon to oxygen linkage and are preferably hydrocarbon radicals as illustrated by the following: lower alkyl, for instance ethyl, butyl and amyl; aromatic, for instance phenyl and tolyl; aralkyl, for instance benzyl. However, other types of radicals are also suitable as these groups may be varied within wide limits without appreciably effecting the chemical properties of the anhydrides and in particular their reactivity with amines. It is believed that one skilled in the art will have little difficulty selecting many suitable radicals for Z and Z'.

Mixed anhydrides of the above formula constitute the subject matter of my copending U. S. application S. N. 208,988 filed concurrently herewith and may be prepared by the procedure set forth therein. The mixed anhydride of almost any monobasic or polybasic carboxylic acid is suitable for the process of this invention.

The reaction is believed to take place (in the case of a primary amine) according to the following equation:

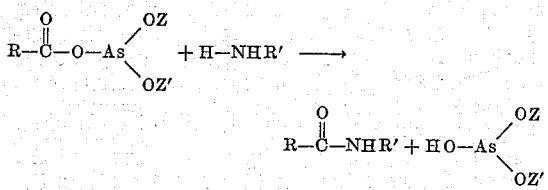

where R' is an organic radical and R, Z and Z' are as defined above. The reaction is the same for secondary amines except that the disubstituted amide is produced. Thus it will be seen that the method is a general one whereby the mono and disubstituted amides of carboxylic acids may be prepared.

The particular mixed anhydride employed depends upon the substituted amide desired as may be seen from the above equation. For example, the substituted amides of the following types of carboxylic acids may be prepared by employing the corresponding mixed anhydride: aliphatic carboxylic acids, for instance acetic, propionic, butyric, caprylic and oleic; polybasic acids, for instance malonic, succinic, adipic and sebacic; substituted aliphatic acids, for instance monochloroacetic and R—CO—NH—CH$_2$—COOH where R is alkyl; aromatic acids, for instance benzoic and naphthalic; heterocyclic acids, for instance nicotinic and thiophene carboxylic; alicyclic acids, for instance cyclohexanecarboxylic acid.

Any amine which has amine hydrogen is suitable for the process of the invention. Such amines may be illustrated by the following: primary aliphatic amines, for instance methylamine, ethylamine, propylamine, butylamine, hexylamine, and allylamine; secondary aliphatic amines, for instance dimethylamine, and dibutylamine; substituted aliphatic amines, for instance chloroethylamine, phenethylamine and benzylamine; aromatic amines, for instance aniline, and naphthylamine; substituted aromatic amines, for instance m-toluidine, p-benzylaniline, o-chloroaniline, and 2,4-dibromo-6-nitroaniline; secondary mixed aliphatic-aromatic amines, for instance N-allylaniline, and benzylaniline; cyclic amines, for instance piperidine, and morpholine; heterocyclic amines, for instance aminopyrimidine; diamines, for instance butylenediamine, and diethylenediamine. In the case of diamines, etc., the monoacylated or the polyacylated derivative can be formed depending upon the number of molecular equivalents of mixed anhydride employed.

The method of this invention is of particular interest in the preparation of amides from the naturally occurring aminoacids. According to many of the methods of the prior art when amides were made from the optically active acids, a large amount of racemization occurred, but by the method of this invention, very little difficulty is encountered. In many instances the amides are produced in such pure form that crystallization results from the reaction mixture where the methods of the prior art result in oils. The aminoacid may constitute either the acid from which the mixed anhydride is formed or the amine which is reacted with the mixed anhydride to form the substituted amide. As explained in my above-mentioned copending application, when the aminoacids are employed in making the mixed anhydrides, it is advantageous to block the amino group by acylation or substitution to prevent side reactions. Likewise, it is advantageous to react the mixed anhydride with an aminoacid ester or amide rather than with the free aminoacid as the free aminoacids form zwitter-ions which are only slightly soluble in organic solvents. Therefore, in peptide synthesis, the peptide ester or amide is formed and if the free peptide acid is desired, it can be obtained by removal of the ester or amide group by hydrolysis.

Aminoacids which are of particular interest in connection with the process of this invention may be illustrated by the following: alanine, valine, norvaline, leucine, norleucine, isoleucine, phenylalanine, tyrosine, serine, cysteine, methionine, aspartic acid, glutamic acid, lysine, ornithine, asparagine, histidine, and tryptophane. Generally speaking these aminoacids are alpha amino-acids having from two to twelve carbon atoms.

The method offers a very convenient means of preparing long chain polypeptides. For instance, a dipeptide ester may be prepared according to the procedure set forth above, the ester group removed by hydrolysis, a mixed anhydride of the dipeptide prepared according to the procedure of my above-mentioned copending application, the mixed anhydride reacted with an aminoacid ester to obtain the tripeptide derivative, and so on. The method is also of particular interest in preparing substituted amides from compounds having sensitive groups, such as the aldehyde or keto group, since methods of the prior art often result in the destruction of such groups.

The reaction is preferably performed in an inert solvent. Suitable inert solvents may be illustrated by the following: aromatic hydrocarbons, for instance xylene, and toluene; aliphatic hydrocarbons, for instance normal octane; chlorinated hydrocarbons, for instance chloroform, carbon tetrachloride, and chlorobenzene; aliphatic ethers, for instance ethyl ether, and butyl ether; cyclic ethers, for instance dioxane; and with less satisfactory results, aliphatic ketones, for instance dibutyl ketone and aliphatic esters, for instance ethyl acetate. Choice of solvent will depend primarily upon the solubility of the reactants therein and upon convenience. The aromatic hydrocarbons are preferred. When an inert solvent is employed, the mixed anhydride may be formed in situ without the need of isolation.

The reaction may be carried out at room temperature or at any other temperature below the decomposition point of the reactants or reaction product. Usually, however, one is limited as a matter of convenience to the reflux temperature of the solvent employed and temperatures in the range of 40–115° C. are preferred. The reaction proceeds immediately at room temperature and is substantially complete in about twelve hours. The reaction is usually complete in about ten minutes to one-half hour at 80° C., and in a proportional length of time at intermediate temperature.

The invention will be more particularly illustrated by means of the following specific examples, in which all parts are by weight unless otherwise indicated:

*Example I*

A solution of 4.18 parts by weight of carbobenzoxyglycine and 2.04 parts by weight of triethylamine in 50 parts by volume of toluene is prepared and to this is added dropwise 4.0 parts by weight of chlorodiethylarsenite. An exothermic reaction occurs. The resulting precipitate of triethylamine hydrochloride is removed by filtration leaving a clear solution of the mixed anhydride of arsenous acid diethyl ester and carbobenzoxyglycine.

To the above solution of mixed anhydride there is added 1.86 parts by weight of aniline and the resulting solution refluxed for one hour during which time carbobenzoxyglycineanilide precipitates. Upon recrystallization from methanol the carbobenzoxyglycineanilide forms colorless, crystalline plates having a melting point of from about 146–147° C.

In place of the chlorodiethylarsenite, there can be substituted an equal molar quantity of other haloarsenites, for instance bromodiethylarsenite, chlorodiamylarsenite, chlorodiphenylarsenite, and chlorodibenzylarsenite, with good results.

The above simple procedure can be employed in preparing an endless number of mono and disubstituted amides by substituting an equal molar quantity of other amines in place of aniline and/or an equal molar quantity of other carboxylic acids in place of carbobenzoxyglycine. For instance, 1-acetylpiperidine is prepared by employing piperidine in place of aniline and acetic acid in place of carbobenzoxyglycine.

*Example II*

To a solution of 4.18 parts by weight of carbobenzoxyglycine and 2.04 parts by weight of triethylamine in 50 parts by volume of chloroform there is added dropwise 4.0 parts by weight of chlorodiethylarsenite. To the resulting solution of the mixed anhydride and triethylamine hydrochloride there is added a solution of 4.59 parts by weight of dl-phenylalanine ethyl ester hydrochloride and 2.04 parts by weight of triethylamine in about 40 parts by volume of chloroform. This mixture is then heated at reflux for two hours and allowed to stand overnight at room temperature. There is then added 50 parts by volume of water to precipitate arsenic trioxide and the chloroform layer is separated and concentrated to a thick oil on a steam bath. Treatment of this oil with dilute sodium bicarbonate results in the crystallization of carbobenzoxyglycyl-dl-phenylalanate as colorless needles having a melting point of about 88–90° C.

*Example III*

To a solution of 2.09 parts by weight of carbobenzoxyglycine and 1.02 parts by weight of triethylamine in 40 parts by volume of dry toluene there is added a warm solution of chloro-o-phenylenearsenite in about 50 parts by volume of toluene. Triethylamine hydrochloride precipitates immediately. The reaction mixture is heated to the boiling point for several minutes, then cooled and the insoluble triethylamine hydrochloride removed by filtration, leaving a clear solution of the mixed anhydride of arsenous acid o-phenylenediester and carbobenzoxyglycine.

To the above solution of mixed anhydride there is added 0.93 part by weight of aniline and the mixture refluxed for one hour. On cooling, the carbobenzoxyglycylanilide separates as colorless, crystalline plates having a melting point of about 145–147° C.

*Example IV*

To a solution of 4.46 parts by weight of carbobenzoxy-dl-alanine and 2.04 parts by weight of triethylamine in 50 parts by volume of toluene there is added 4.01 parts by weight of chlorodiethylarsenite in portions with stirring. After several minutes the reaction mixture is cooled and the precipitate of triethylamine hydrochloride removed by filtration leaving a clear solution of the mixed anhydride of arsenous acid diethyl ester and carbobenzoxy-dl-alanine.

To the above solution of the mixed anhydride there is added 3.86 parts by weight of ethyl-dl-phenylalanate and the reaction mixture heated under reflux for one and one-half hours. The solution is then concentrated by evaporation in a stream of air to leave a colorless crystalline residue. This residue is dispersed in 25 parts by volume of hot ethyl acetate which is then filtered to remove the insoluble arsenic trioxide. On the addition of 200 parts by volume of petroleum ether to the filtrate, carbobenzoxy-dl-alanyl-dl-phenylalanine ethyl ester slowly crystallizes as colorless needles having a melting point of about 104–106° C.

*Example V*

To a solution of 5.31 parts by weight of carbobenzoxy-L-leucine and 2.04 parts by weight of triethylamine in 50 parts by volume of toluene there is added 4.01 parts by weight of chlorodiethylarsenite. After several minutes the reaction mixture is cooled and the triethylamine hydrochloride removed by filtration, leaving a clear solution of the mixed anhydride of arsenous acid diethyl ester and carbobenzoxy-L-leucine.

To the above solution of mixed anhydride there is added 3.86 parts by weight of ethyl dl-phenylalanate and the reaction mixture heated under reflux for one and one-half hours. The solution is then concentrated by evaporation in a stream of air to give a colorless crystalline residue. This residue is dispersed in 25 parts by volume of hot ethyl acetate which is then filtered to remove the insoluble arsenic trioxide. On the addition of 200 parts by volume of petroleum ether to the filtrate, carbobenzoxy-L-leucyl-dl-phenylalanine ethyl ester slowly crystallizes as colorless crystals melting at about 90° C.

*Example VI*

In about 30 parts by volume of toluene there is dispersed 2.66 parts by weight of carbobenzoxyglyclglycine and 1.02 parts by weight of triethylamine and the mixture heated for ten to fifteen minutes until salt formation is complete. There is then added 2.01 parts by weight of chlorodiethylarsenite and the heating continued for an additional five to ten minutes.

To the above solution of mixed anhydride there is added 1.93 parts by weight of ethyl dl-phenylalanate and the mixture heated under reflux for one and one-half hours. The solution is then concentrated by evaporation in a stream of air to leave a crystalline residue. This residue is dispersed in 15 parts by volume of hot ethyl acetate which is then filtered to remove insoluble arsenic trioxide and triethylamine hydrochloride. On the addition of 100 parts by volume of petroleum ether to the filtrate there is slowly crystallized carbobenzoxyglycylglycyl-dl-phenylalanine ethyl ester as colorless needles melting at about 80–82° C.

I claim:

1. A method of preparing substituted amides which comprises reacting an amine having amine hydrogen with a mixed anhydride of a carboxylic acid and a diester of arsenous acid.

2. The method of claim 1 where said mixed anhydride is a mixed anhydride of a diester of arsenous acid and an alpha-acidaminocarboxylic acid.

3. A method of preparing substituted amides which comprises reacting an amine having amine hydrogen in an inert solvent at a temperature between 0–140° C. with a mixed anhydride of arsenous acid diethyl ester and carbobenzoxyglycine.

4. A method of preparing carbobenzoxyglycylanilide which comprises reacting aniline in an inert solvent at a temperature of 40–115° C. with the mixed anhydride of arsenous acid diethyl ester and carbobenzoxyglycine.

5. A method of preparing peptides which comprises reacting an aminoacid ester in an inert solvent at a temperature of 0–140° C. with a mixed anhydride of a diester of arsenous acid and an alpha-acidamidocarboxylic acid.

6. The method of claim 5 where said mixed anhydride is a mixed anhydride of arsenous acid diethyl ester.

7. The method of claim 5 where said aminoacid ester is an ester of phenylalanine and said mixed anhydride is a mixed anhydride of a diester of arsenous acid and an acidamidoacetic acid.

8. A method of preparing carbobenzoxyglycylphenylalanine ethyl ester which comprises reacting phenylalanine ethyl ester in an inert solvent at a temperature of 40–115° C. with the mixed anhydride of arsenous acid diethyl ester and carbobenzoxyglycine.

9. The method of claim 5 where said aminoacid ester is an ester of phenylalanine and said mixed anhydride is a mixed anhydride of a diester of arsenous acid and an alpha-acidamidopropionic acid.

10. A method of preparing carbobenzoxyalanylphenylalanine ethyl ester which comprises reacting phenylalanine ethyl ester in an inert solvent at a temperature of 40–115° C. with the mixed anhydride of arsenous acid diethyl ester and carbobenzoxyalanine.

11. A method of making carbobenzoxyglycylglycylphenylalanine ethyl ester which comprises reacting phenylalanine ethyl ester in an inert solvent at a temperature of 40–115° C. with the mixed anhydride of arsenous acid diethyl ester and carbobenzoxyglycylglycine.

12. A method of preparing optically active peptides which comprises reacting an aminoacid ester in an inert solvent at a temperature of 0–140° C. with a mixed anhydride of arsenous acid diethyl ester and an optically active alpha-acidamidocarboxylic acid.

13. A method of preparing carbobenzoxy-L-leucyl-dl-phenylalanine ethyl ester which comprises reacting dl-phenylalanine ethyl ester in an inert solvent at a temperature of 40–115° C. with a mixed anhydride of arsenous acid diethyl ester and carbobenzoxy-L-leucine.

14. A method of forming an amide linkage which comprises reacting a compound having a free amino group, said amino group having amine hydrogen, with a mixed anhydride of a carboxylic acid and a diester of arsenous acid.

JAMES R. VAUGHAN, Jr.

No references cited.